United States Patent [19]
Gill

[11] Patent Number: 5,898,549
[45] Date of Patent: Apr. 27, 1999

[54] ANTI-PARALLEL-PINNED SPIN VALVE SENSOR WITH MINIMAL PINNED LAYER SHUNTING

[75] Inventor: Hardayal Singh Gill, Portola Valley, Calif.

[73] Assignee: International Business Machines Corporation, Armonk, N.Y.

[21] Appl. No.: 08/958,606

[22] Filed: Oct. 27, 1997

[51] Int. Cl.[6] .................................................. G11B 5/39
[52] U.S. Cl. ........................................................ 360/113
[58] Field of Search ............................... 360/113, 126; 338/32 R; 324/252

[56] References Cited

U.S. PATENT DOCUMENTS

| 5,206,590 | 4/1993 | Dieny et al. | 324/252 |
|---|---|---|---|
| 5,408,377 | 4/1995 | Gurney et al. | 360/113 |
| 5,465,185 | 11/1995 | Heim et al. | 360/113 |
| 5,508,866 | 4/1996 | Gill et al. | 360/113 |
| 5,583,725 | 12/1996 | Coffey et al. | 360/113 |
| 5,701,222 | 12/1997 | Gill et al. | 360/113 |
| 5,701,223 | 12/1997 | Fontana, Jr. et al. | 360/113 |
| 5,737,157 | 4/1998 | Gill | 360/113 |
| 5,739,988 | 4/1998 | Gill | 360/113 |
| 5,748,399 | 5/1998 | Gill | 360/66 |
| 5,768,069 | 6/1998 | Mauri | 360/113 |
| 5,768,071 | 6/1998 | Lin | 360/113 |
| 5,793,207 | 8/1998 | Gill | 324/252 |
| 5,793,576 | 8/1998 | Gill | 360/113 |
| 5,796,561 | 8/1998 | Mauri | 360/113 |

OTHER PUBLICATIONS

IBM TDB, R.L. Anderson, "Evaporated Soft Bias Films", Jul. 1978, p. 852.

*Primary Examiner*—Jefferson Evans
*Attorney, Agent, or Firm*—Paik Saber

[57] ABSTRACT

An Anti-Parallel (AP)-Pinned SV sensor having a free layer separated from an AP-pinned layer by a conducting spacer. The AP-pinned layer includes a first, second and third pinned layers where the first pinned layer is separated from the second and third pinned layers by an anti-parallel coupling layer. An antiferromagnetic (AFM) layer is used to pin the AP-pinned layer magnetizations directions. The first pinned layer is formed over and in contact with the AFM layer. The first and second pinned layers are made of highly resistive material such as NiFeCr and the third pinned layer is made of low resistive material such as cobalt. The use of a highly resistive first and second pinned layers reduces the amount of sense current flowing in the AP-pinned layer as well as eliminating interdifussion at the AFM/first pinned layer interface resulting in larger GMR coefficient, well controlled net moment, highly stable sensor, and reduced read signal asymmetry.

18 Claims, 6 Drawing Sheets

ANTI-PARALLEL-PINNED SPIN VALVE SENSOR WITH MINIMAL PINNED LAYER SHUNTING

BACKGROUND OF THE INVENTION

1. Field of the Invention

This invention relates generally to spin valve magnetic transducers for reading information signals from a magnetic medium and, in particular, to an improved antiparallel-pinned spin valve sensor, and to magnetic recording systems which incorporate such sensors.

2. Description of Related Art

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the GMR effect (SV effect). In an SV sensor, one of the ferromagnetic layers, referred to as the pinned layer, has its magnetization typically pinned by exchange coupling with an antiferromagnetic (e.g., NiO or Fe—Mn) layer. The magnetization of the other ferromagnetic layer, referred to as the free layer, however, is not fixed and is free to rotate in response to the field from the recorded magnetic medium (the signal field). In SV sensors, the SV effect varies as the cosine of the angle between the magnetization of the pinned layer and the magnetization of the free layer. Recorded data can be read from a magnetic medium because the external magnetic field from the recorded magnetic medium (the signal field) causes a change in the direction of magnetization in the free layer, which in turn causes a change in resistance of the SV sensor and a corresponding change in the sensed current or voltage. It should be noted that the AMR effect is also present in the SV sensor free layer and it tends to reduce the overall GMR effect.

FIG. 1 shows a typical SV sensor 100 comprising end regions 104 and 106 separated by a central region 102. The central region 102 has defined edges and the end regions are contiguous with and abut the edges of the central region. A free layer (free ferromagnetic layer) 110 is separated from a pinned layer (pinned ferromagnetic layer) 120 by a non-magnetic, electrically conducting spacer 115. The magnetization of the pinned layer 120 is fixed through exchange coupling with an antiferromagnetic (AFM) layer 121. Free layer 110, spacer 115, pinned layer 120 and the AFM layer 121 are all formed in the central region 102. Hard bias layers 130 and 135 formed in the end regions 104 and 106, respectively, provide longitudinal bias for the free layer 110. Leads 140 and 145 formed over hard bias layers 130 and 135, respectively, provide electrical connections for the flow of the sensing current $I_s$ from a current source 160 to the MR sensor 100. Sensing means 170 connected to leads 140 and 145 sense the change in the resistance due to changes induced in the free layer 110 by the external magnetic field (e.g., field generated by a data bit stored on a disk).

IBM's U.S. Pat. No. 5,206,590 granted to Dieny et al. and incorporated herein by reference, discloses an MR sensor operating on the basis of the SV effect.

Another type of spin valve sensor currently under development is an antiparallel (AP)-pinned spin valve sensor. FIGS. 2A–2B show an AP-Pinned SV sensor 200 which has been a subject of experiment and modeling by the present inventor. SV sensor 200 has end regions 202 and 204 separated from each other by a central region 206. AP-pinned SV sensor 200 further comprises a Ni—Fe free layer 225 separated from a laminated AP-pinned layer 210 by a copper spacer layer 220. The magnetization of the laminated AP-pinned layer 210 is fixed by an AFM layer 208 which is made of NiO. The laminated AP-pinned layer 210 includes a first ferromagnetic layer 212 (PF1) of cobalt and a second ferromagnetic layer 216 (PF2) of cobalt separated from each other by a ruthenium antiparallel coupling layer 214. The AMF layer 208, AP-pinned layer 210, copper spacer 220, free layer 225 and a cap layer 230 are all formed sequentially in the central region 206. Hard bias layers 235 and 240, formed in end regions 202 and 204, provides longitudinal biasing for the free layer 225. Electrical leads 245 and 250 are also formed in end regions 202 and 204, respectively, to provide electrical current from a current source (not shown) to the SV sensor 200. The magnetization direction 265 of the free layer 225 is set to be parallel to the ABS in the absence of an external field. The magnetizations directions 255 and 260 of the pinned layers 212 and 216, respectively, are anti-parallel with each other and are set to be perpendicular to the ABS.

A key advantage of the AP-pinned SV sensor of FIG. 2A is the improvement of the exchange coupling field strength between the AFM layer 208 and AP-pinned layer 210. This improved exchange coupling increases the stability of the AP-pinned SV sensor 200 at high temperatures which allows the use of corrosion resistant antiferromagnetic materials such as NiO for the AFM layer 208.

Despite of its key advantage, there are two major problems associated with the AP-pinned SV sensor of FIG. 2A.

First, the exchange coupling field between the AFM layer 208 and the AP-pinned layer 210 is inversely proportional to the magnetic moment difference (net magnetic moment) between the two AP-pinned ferromagnetic layers 212 and 216. However, it is very difficult to control the net moment of the AP-pinned layer 210 (Co/Ru/Co) because of interfacial diffusion and oxidation that takes place at the interface between the NiO AFM layer 208 and the first pinned layer 212 of Co. This interaction between the NiO AFM layer 208 and the Co first pinned layer 212 creates magnetic dead layer at the NiO/Co interface. The interfacial diffusion and oxidation that take place at the aforementioned interface causes a change in the moment of the first pinned Co layer 212 even after the AP-pinned SV sensor of FIG. 2A has been completely built. The change in the moment of the first pinned layer 212 causes the change in the net moment of the AP-pinned layer 210 by factors of 2 to 3 from one wafer to another. Such large variations in the net moment of the AP-pinned layer 210 result in large variations in pinning fields which compromises the stability of the SV sensor 200 as well as the size and symmetry of the signals detected (read) by the sensor.

Second, substantial amount of the sense current flows in the AP-pinned layer 210 due to the fact that cobalt has a low electrical resistivity of about 12 $\mu\Omega Cm$. TABLE I summarizes the result of a modeling simulation on the SV sensor 200.

TABLE I

AP-PINNED SV SENSOR OF FIGS. 2A–2B

| Material | | Thickness (Å) | Sheet Resistance $\mu\Omega$ cm | Sense Current Shunting (%) |
|---|---|---|---|---|
| NiO | layer 208 | 400 | insulator | — |
| CO | layer 212 | 29 | 11.6 | 15 |
| Ru | layer 214 | 6 | 20 | 1.25 |
| CO | layer 216 | 24 | 11.6 | 12 |
| Cu | layer 220 | 22 | 2.7 | 47 |
| NiFe | layer 225 | 72 | 25 | 24 |
| TA | layer 230 | 50 | 200 | 2 |

According to the results summarized in TABLE I, about 28.25% of the sense current flows in the AP-pinned layer 210. Furthermore, about 15% of the sense current flows in the cobalt layer 212 which does not contribute to reading signals from a magnetic disk. Such a large current flow in the cobalt layers and inability to control the net moment of the cobalt layers contributes to smaller GMR coefficient and read signal asymmetry. Smaller GMR coefficient is due to the fact that a sizeable portion of the sense current flows in a layer that does not contribute to the GMR coefficient. Read signal asymmetry is due to the fact that the current field ($H_I$), demag field ($H_{Demag}$) and the ferromagnetic coupling field ($H_{FC}$) effects (all in the same direction) on the free layer magnetization (FIG. 2B) are larger than the effect of the AMR on the free layer magnetization direction 265.

Therefore, there is a need for an AP-pinned SV sensor where the amount of current flow in the AP-pinned layer is minimized and the AP-pinned layer has a well controlled net moment.

SUMMARY OF THE INVENTION

It is an object of the present invention to disclose an improved AP-Pinned SV sensor having an AP-pinned layer where the amount of current flow in the AP-pinned layer is minimized.

It is a further object of the present invention to disclose an improved AP-Pinned SV sensor having an AP-pinned layer where the net moment of the AP-pinned layer is well controlled.

It is still another object of the present invention to disclose an AP-pinned SV sensor with improved read signal symmetry.

It is another object of the present invention to disclose an AP-pinned SV sensor having an AP-pinned layer and an antiferromagnetic layer (AFM) where there is no oxidation at the interface between the AFM layer and the AP-pinned layer.

It is yet another object of the present invention to disclose an AP-pinned SV sensor with high corrosion resistance.

The foregoing objects and others are achieved in accordance with the principles of the present invention where there is disclosed an AP-pinned SV sensor having end regions separated from each other by a central region. The central region has defined edges and the end regions are contiguous with and abut the edges of the central region. The AP-pinned SV sensor further includes a ferromagnetic free layer separated from an AP-pinned layer by a non-magnetic electrically conducting layer. The AP-pinned layer comprises a first, second and third pinned layers of ferromagnetic material where the first pinned layer is separated from the second and third pinned layers by a non-magnetic antiferommagnetically coupling layer. The second and third pinned layers are in direct contact with each other. An antiferromagnetic (AFM) layer is in contact with the first pinned layer and provides the exchange coupling field necessary to pin the magnetization direction of the AP-pinned layer. First and second pinned layers are made of high electrical resistivity material such as NiFeCr, NiFeRh or NiFeMo to minimize the current flow in the AP-pinned layer. The third pinned layer is made of low electrical resistivity material such as cobalt to maximize the GMR coefficient.

By using high electrical resistivity material, the amount of sense current shunting (flowing) in the AP-pinned layer and specifically, the amount of sense current shunting in the first pinned layer which is in contact with the AFM layer is substantially minimized resulting in an AP-pinned sensor with enhanced read signal amplitude, enhanced read signal symmetry, and enhanced sensor stability due to the absence of interdiffusion at the AFM/AP-pinned layer interface.

The above as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
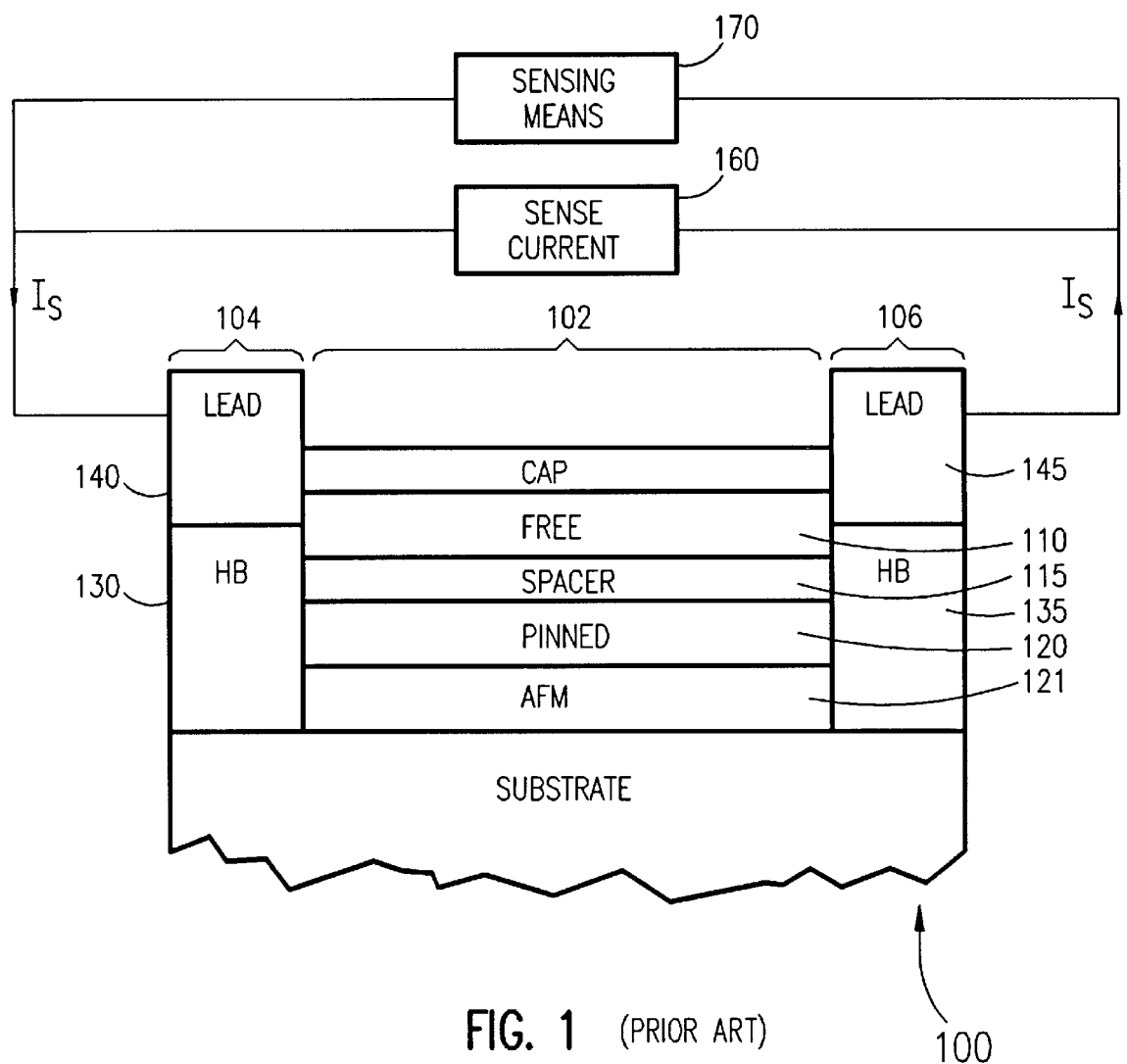
FIG. 1 is an air bearing surface view of a prior art SV sensor.
Figure 2A:
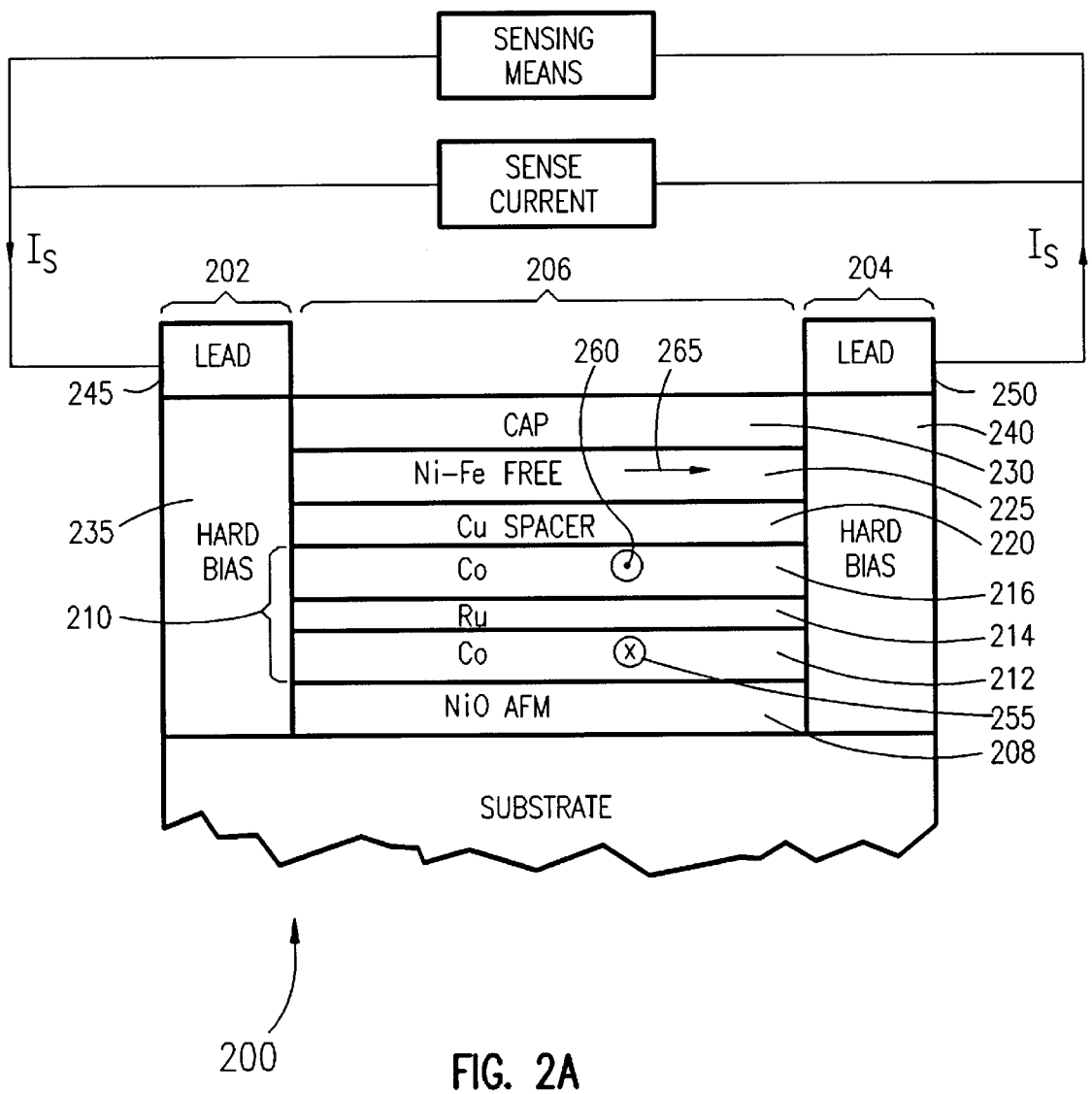
FIG. 2A is an air bearing surface view, not to scale, of an AP-pinned SV sensor.
Figure 2B:
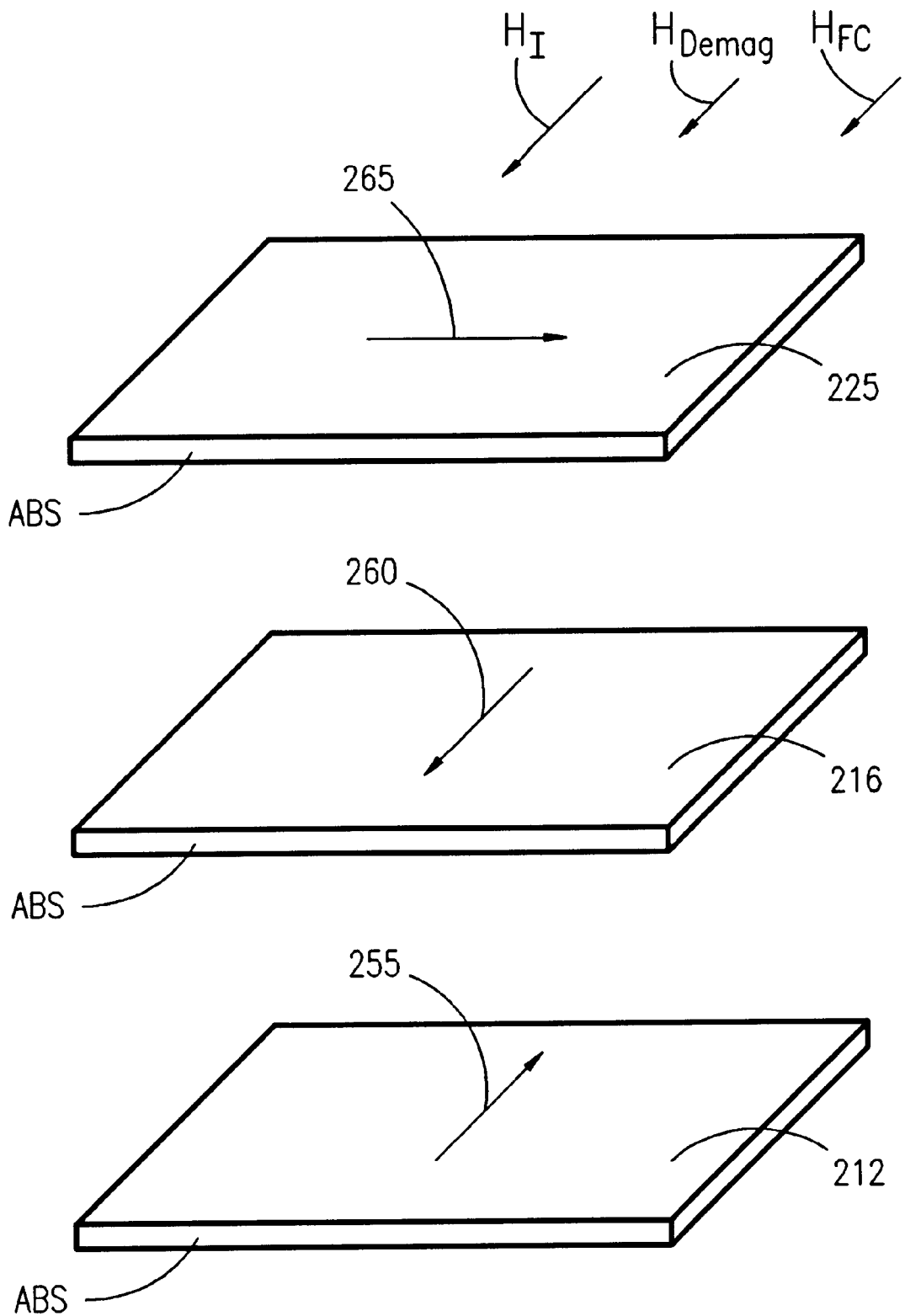
FIG. 2B is a perspective view, not to scale, of the AP-pinned SV sensor of FIG. 2A.
Figure 3:
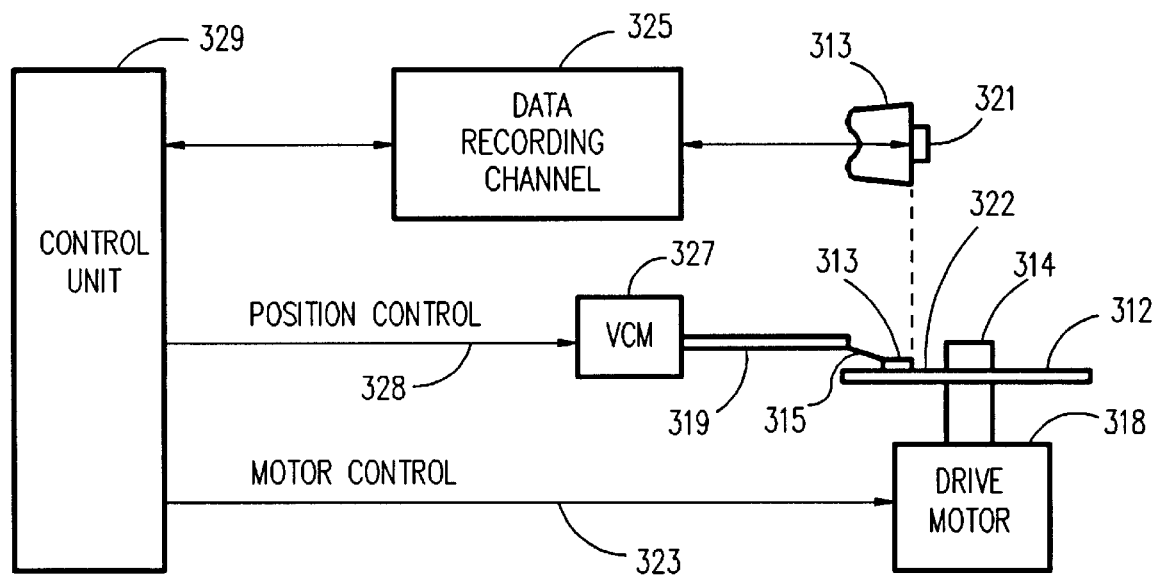
FIG. 3 is a simplified block diagram of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321 where the head 321 incorporates the MR sensor of the present invention. As the disks rotate, slider 313 is moved radially in and out over disk surface 322 so that heads 321 may access different portions of the disk where desired data is recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 (the surface of slider 313 which includes head 321 and faces the surface of disk 312 is referred to as an air bearing surface (ABS)) and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by means of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4A:
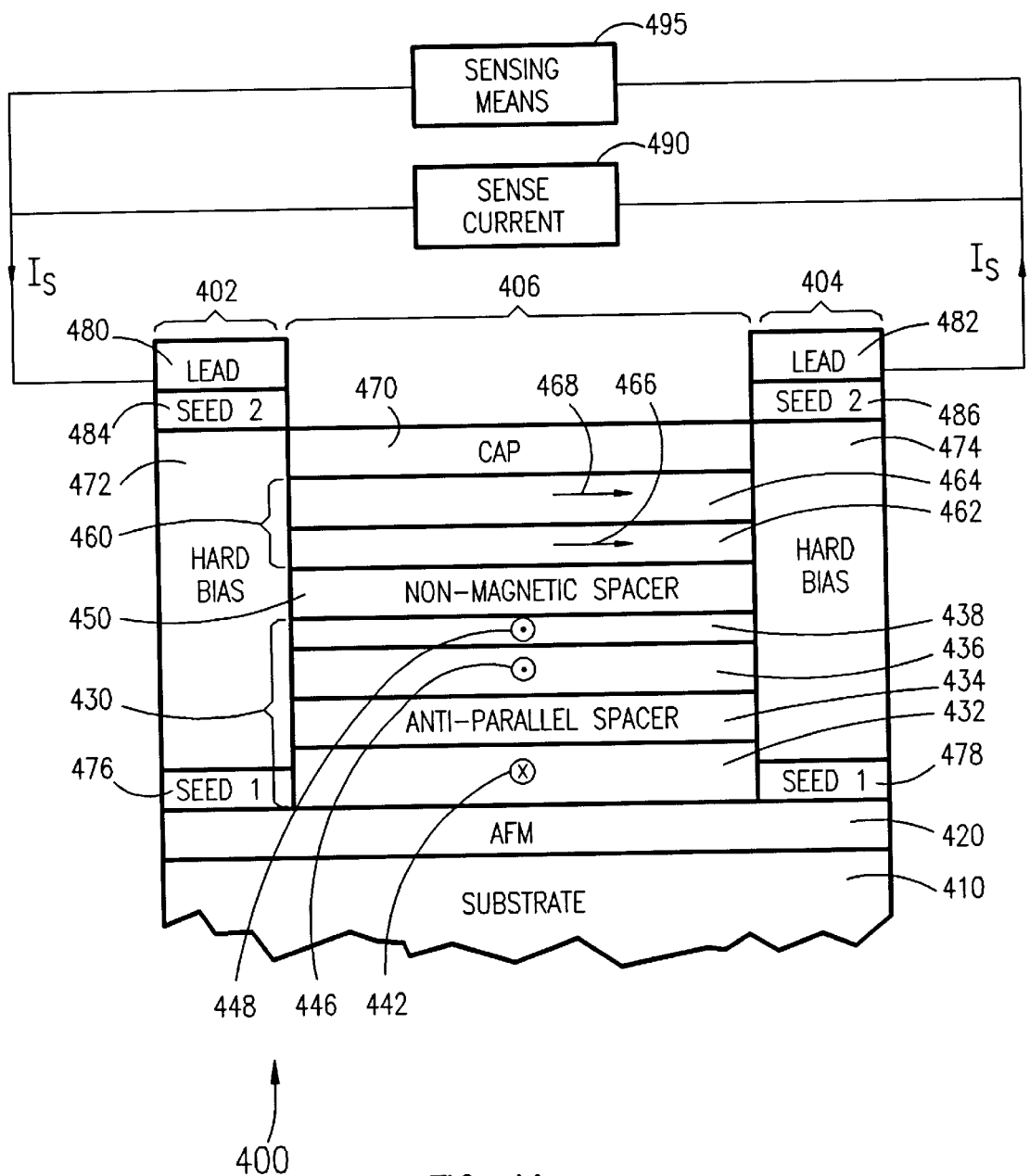
FIG. 4A is an air bearing surface view, not to scale, of the AP-pinned SV sensor of the present invention.

Now, with reference to FIG. 4A, there is shown an air bearing surface (ABS) view of the AP-pinned SV sensor 400 according to the preferred embodiment of the present invention. SV sensor 400 has end regions 402 and 404 separated from each other by a central region 406. Central region 406 has defined edges where the end regions 402 and 404 form a contiguous junction with and abut said edges. Substrate 410 can be any suitable substance, including glass, semiconductor material, or a ceramic material, such as alumina ($Al_2O_3$). Antiferromagnetic (AFM) layer 420 is formed over the substrate 410 in both the central region 406 as well as the end regions 402 and 404. Alternatively, the AFM layer 420 may be formed only in the central region 406. The AFM layer 420 is preferably made of NiO material although it may also be made of other type of antiferromagnetic material such as NiMn. A laminated AP-pinned layer 430 is subsequently formed over the AFM layer 420. The AP-pinned layer 430 comprises first, second and third pinned layers 432, 436 and 438 of ferromagnetic materials, respectively. The first pinned layer 432 is separated from the second and third pinned layers 436 and 438 by an anti-parallel coupling layer 434 of nonmagnetic material that allows pinned layer 432 to be strongly coupled to pinned layers 436 and 438 antiferromagnetically. In the preferred embodiment, first pinned layer 432 is a layer of highly resistive non-corrosive material such as NiFeCr which is deposited on and in contact with the AFM layer 420. Alternatively, first pinned layer 432 may be made of NiFeRh or NiFeMo. The anti-parallel coupling layer 434 is generally made of ruthenium (Ru) although it may also be made of iridium (Ir) or Rhodium (Rh). Second pinned layer 436 is also made of highly resistive material. In the preferred embodiment of the present invention, second pinned layer 436 is also made of NiFeCr although it may also be made of NiFeRh or NiFeMo. Third pinned layer 438 which is formed over and in contact with the second pinned layer 436 is made of low resistivity material such as cobalt to increase the scattering across the non-magnetic spacer layer 450. Higher scattering across the spacer layer 450 results in higher GMR coefficient. The spacer layer 450 is formed over and in contact with the third pinned layer 438. The spacer layer 450 is preferably made of copper although it may also be made of gold (Au) or silver (Ag). A free ferromagnetic layer 460 is subsequently formed over and in contact with the spacer layer 450. Free layer 460 is preferably made of first free layer of cobalt 462 deposited over and in contact with the spacer layer 450 and a second free layer 464 of Ni—Fe deposited over and in contact with the first free layer 462. Alternatively, free layer 460 may be made of a single layer of Co or a single layer of Ni—Fe. Cap layer 470 is subsequently formed over the free layer 460 to protect the material deposited in the central region against oxidation. The cap layer is preferably made of tantalum (Ta). In the preferred embodiment of the present invention, pinned layer 430, spacer 450, free layer 460 and the cap layer 470 are all formed only in the central region 406.

Figure 4B:
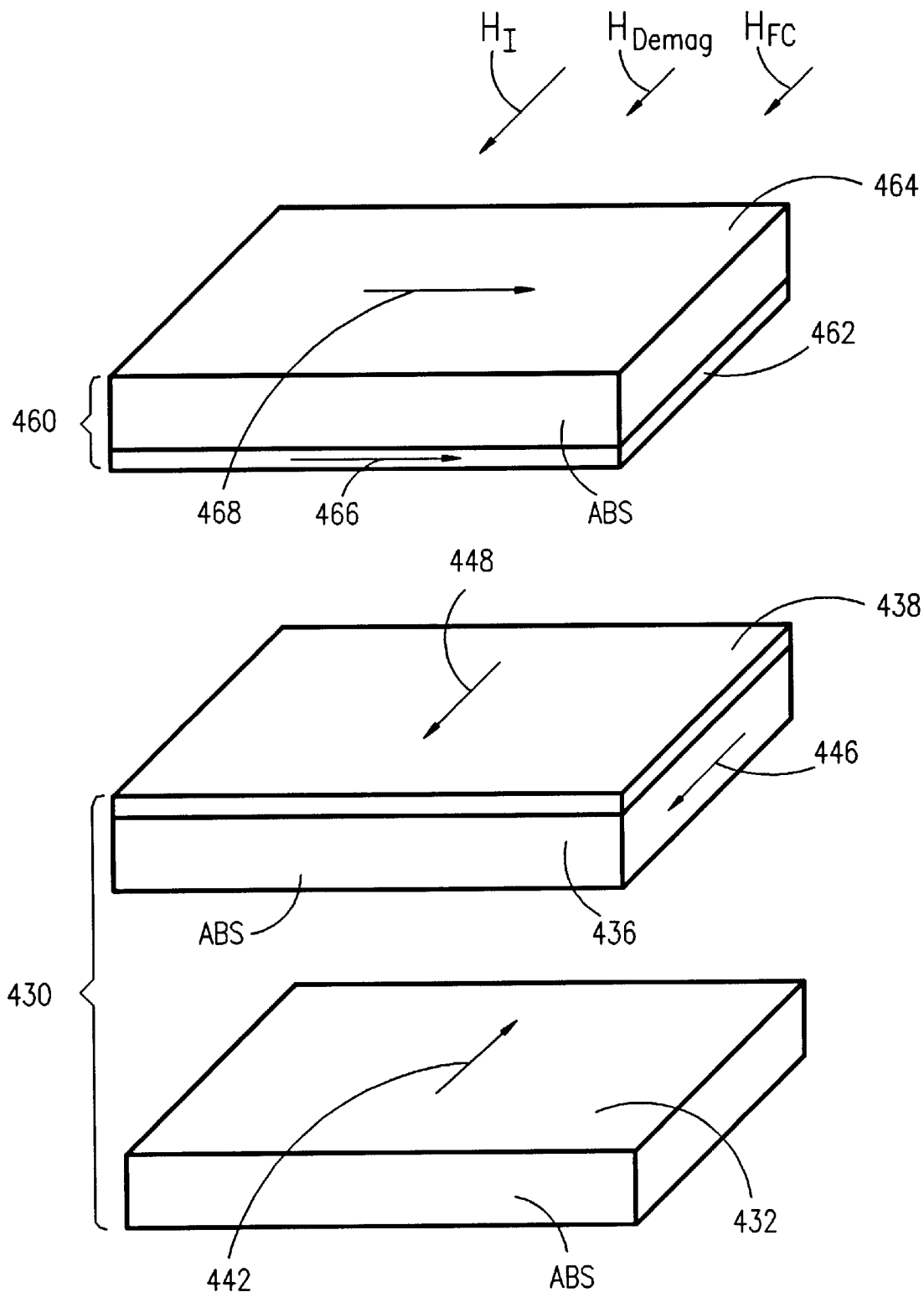
FIG. 4B is a perspective view, not to scale, of the free and AP-pinned layers of the AP-pinned SV sensor of FIG. 4A.

Referring again to FIGS. 4A and 4B, first pinned layer 432 in the laminated AP-pinned layer 430 has its magnetization direction 442 oriented generally perpendicular to the ABS and antiparallel with respect to the second and third pinned layers 436 and 438 magnetizations directions 446 and 448, respectively. The antiparallel alignment of the magnetization direction 442 of the first pinned layer 432 with respect to the magnetizations directions 446 and 448 of the second and third pinned layers 436 and 438 is due to an antiferromagnetic exchange coupling through the anti-parallel coupling layer 434. In the absence of an applied field, the free layer 460 has its magnetization direction 466 and 468 generally perpendicular to the magnetizations directions 442, 446, 448 of the pinned layers 432, 436, and 438 and preferably parallel with the ABS.

Referring again to FIG. 4A, SV sensor 400 further includes hard bias layers 472 and 474, formed in the end regions 402 and 404, respectively, for longitudinally biasing the free layer 460. Biasing layers 472 and 474 are preferably made of CoPtCr and may be formed over seed1 layers 476 and 478 in order to improve their coercivity and magnetic squareness.

Electrical leads 480, 482 are also formed over hard bias layers 472 and 474, respectively to form a circuit path between the SV sensor 400 and a current source 490 and a sensing means 495. In the preferred embodiment, leads 480 and 482 are formed over seed 2 layers 484 and 486 in order to improve their electrical conductivity. Sensing means 495 comprises a recording channel which is preferably a digital recording channel such as partial-response maximum likelihood or peak detect recording channel as is known to those skilled in the art. Alternatively, sensing means 495 may comprise an analog recording channel. In the preferred embodiment, a magnetic signal in the medium is sensed by the sensing means 495 detecting the change in resistance, deltaR, as the magnetization direction 466 and 468 of the free layer 460 rotates in response to the applied magnetic signal from the recorded medium.

The AP-pinned SV sensor 400 was modeled (Table II) to determine the effect of using an AP-pinned layer 430 having three pinned layers where the first and second pinned layers 432 and 436 were made of highly resistive and corrosion resistance material such as NiFeCr.

TABLE II

AP-PINNED SV SENSOR OF THE PRESENT INVENTION

| Material | Thickness (Å) | Sheet Resistance $\mu\Omega$ cm | Sense Current Shunting (%) |
|---|---|---|---|
| NiO (420) | 400 | insulator | — |
| NiFeCr (432) | 44 | 80 | 4.4 |
| Ru (434) | 6 | 20 | 1.4 |
| NiFeCr (436) | 10 | 80 | 0.7 |
| CO (438) | 20 | 11.6 | 11.2 |
| Cu (450) | 22 | 2.7 | 53 |
| NiFe (460) | 72 | 25 | 27 |
| TA (470) | 50 | 200 | 2 |

Comparing the sense current shunting results shown in TABLES I and II, it can readily be seen that the amount of the sense current flowing in the first pinned layer 432 has been dramatically reduced from 15% of the sense current to only 4.4% of the sense current and the amount of total sense current flowing in the AP-pinned layer 430 was reduced from 28.25% of the sense current to about 17.7% of the sense current. This dramatic reduction in the amount of the sense current flowing in the AP-pinned layer 430 results in a smaller current field ($H_j$) acting on the free layer 460 (FIG. 4B) thus improving the symmetry of the signals sensed by the SV sensor 400. Furthermore, the dramatic reduction in the magnitude of the sense current flowing in the AP-pinned layer 430 results in higher amount of current flowing in the spacer layer 450 and the free layer 460 resulting in a higher GMR coefficient and larger signal amplitudes read by the sensor 400.

Furthermore, the net moment of the AP-pinned layer 430 can be well controlled due to the elimination of interdiffusion at the interface between the AFM layer 420 and the first pinned layer 432 which results in a more stable SV sensor.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

I claim:
1. An anti-parallel (AP)-pinned spin valve (SV) sensor, comprising:
 a free layer of ferromagnetic material;
 a spacer layer of electrically conductive material;
 an AP-pinned layer separated from said free layer by said spacer layer, said AP-pinned layer including:
  an antiferromagnetically coupling layer;
  first, second and third pinned layers of ferromagnetic materials, said first pinned layer being separated from said second and third pinned layers by said antiferromagnetically coupling layer, said first and second pinned layers being made of material having higher electrical resistivity than said third pinned layer material, said third pinned layer being in contact with said spacer layer, wherein said first and second pinned layers are selected from a group of materials consisting of NiFeCr, NiFeRh, and NiFeMo; and
 antiferromagnetic (AFM) layer in contact with said first pinned layer for pinning the magnetization direction of said first pinned layer.
2. The AP-pinned SV sensor as in claim 1 wherein said third pinned layer is made of cobalt.
3. The AP-pinned SV sensor as recited in claim 1 wherein said AFM layer is made of NiO.
4. The AP-pinned SV sensor as recited in claim 1 wherein said AFM layer is made of NiMn.
5. The AP-pinned SV sensor as recited in claim 1 wherein said spacer layer is selected from a group of material consisting of copper, gold and silver.
6. The AP-pinned SV sensor as recited in claim 1 wherein said anti-parallel coupling layer is selected from a group of material consisting of ruthenium, iridium and rhodium.
7. The AP-pinned SV sensor as in claim 1 wherein said free layer further comprises first and second free layers.
8. The AP-pinned SV sensor as in claim 7 wherein said first free layer is made of cobalt and said second free layer is made of Ni—Fe.
9. The AP-pinned SV sensor as in claim 8 wherein the Ni—Fe composition of said second free layer is approximately 81% Ni and 19% Fe.
10. A disk drive system, comprising:
 a magnetic recording disk;
 an anti-parallel (AP)-pinned spin valve (SV) sensor, comprising:
  a free layer of ferromagnetic material;
  an spacer layer of electrically conductive material;
  an AP-pinned layer separated from said free layer by said spacer layer, said AP-pinned layer including:
   an antiferromagnetically coupling layer;
   first, second and third pinned layers of ferromagnetic materials, said first pinned layer being separated from said second and third pinned layers by said antiferromagnetically coupling layer, said first and second pinned layers being made of material having higher electrical resistivity than said third pinned layer material, said third pinned layer being in contact with said spacer layer, wherein said first and second pinned layers are selected from a group of materials consisting of NiFeCr, NiFeRh, and NiFeMo; and
  antiferromagnetic (AFM) layer in contact with said first pinned for pinning the magnetization direction of said first pinned layer;
 an actuator for moving said spin valve sensor across the magnetic recording disk so the spin valve sensor may access different regions of magnetically recorded data on the magnetic recording disk; and means electrically coupled to the spin valve sensor for detecting changes in resistance of the sensor caused by rotation of the magnetization axis of the free ferromagnetic layer relative to the fixed magnetizations of the antiparallel coupled first, second and third pinned layers in the AP-pinned layer in response to magnetic fields from the magnetically recorded data.

11. The disk drive system of claim 10 wherein said third pinned layer is made of cobalt.

12. The disk drive system of claim 10 wherein said AFM layer is made of NiO.

13. The disk drive system of claim 10 wherein said AFM layer is made of NiMn.

14. The disk drive system of claim 10 wherein said spacer layer is selected from a group of material consisting of copper, gold and silver.

15. The disk drive system of claim 10 wherein said antiparallel coupling layer is selected from a group of material consisting of ruthenium, iridium and rhodium.

16. The disk drive system of claim 10 wherein said free layer further comprises first and second free layers.

17. The disk drive system of claim 16 wherein said first free layer is made of cobalt and said second free layer is made of Ni—Fe.

18. The disk drive system of claim 17 wherein the Ni—Fe composition of said second free layer is approximately 81% Ni and 19% Fe.

* * * * *